United States Patent Office 2,725,386
Patented Nov. 29, 1955

2,725,386

2-(1,4-BENZODIOXAN)METHYL DERIVATIVES OF AMINO-LOWER FATTY ACID AMIDES AND PREPARATION THEREOF

Daniel Bovet and Giovanni Battista Marini-Bettolo, Rome, Italy, assignors of fifty per cent to Fondazione Emanuele Paterno, Rome, Italy, an Italian organization No Drawing. Application January 29, 1954, Serial No. 407,144

Claims priority, application Italy February 13, 1953

21 Claims. (Cl. 260—340.3)

This invention relates to certain 2-(1,4-benzodioxan)-methyl derivatives of amino-lower fatty acid amides and to the preparation of the same.

More particularly, the new compounds provided by our invention are derivatives of amino-lower fatty acid amides bearing a 2-(1,4-benzodioxan)methyl radical on either the amino nitrogen or the amide nitrogen which have the structural formula

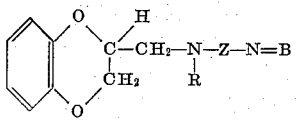

where R is a member of the class consisting of hydrogen and lower alkyl radicals, Z is an alpha-oxo-lower alkylene radical, and —N=B is a member of the group consisting of the amino radical and lower alkylamino, (di-lower alkyl) amino, piperidino, lower alkylpiperidino, morpholino, lower alkylmorpholino, pyrrolidino, and lower alkylpyrrolidino radicals.

The alpha-oxo-lower alkylene radical Z in the formula set forth hereinabove contains at least two carbon atoms and preferably contains two, three, or four carbon atoms; the oxo-bearing carbon atom of Z is alpha (adjacent) to either one of the two nitrogen atoms connected by Z. Equivalently, Z can be described as having the structure —CO—$C_nH_{2n}$— where —$C_nH_{2n}$— is a divalent alkylene radical in which $n$ is one of the integers 1, 2, or 3 and wherein the oxygen-bearing alpha carbon atom is attached to one of the amino radical —N=B and 2-(1,4-benzodioxan)methylamino in our compounds and another carbon atom of the —CO—$C_nH_{2n}$— group is attached to the other amino radical. By way of illustration, the divalent radical Z can be —CO—$CH_2$—, —CO—$CH_2$—$CH_2$—, —CO—CH($CH_3$)—, —CO—$CH_2$—CH($CH_3$)—, —CO—$CH_2$—$CH_2$—$CH_2$—, and the like.

The new compounds of our invention are useful as sympatholytic agents, being antagonists of epinephrine and similar sypathomimetic amines. A particular advantage afforded by our new compounds is the relatively low degree of undesirable effect on the central nervous system as compared with the sympatholytic agents previously available.

By the term "lower alkyl" employed above in the definitions of R and —N=B and elsewhere in this specification, we mean to indicate alkyl radicals of low molecular weight, as methyl, ethyl, propyl, isopropyl, butyl, and the like. We particularly prefer the lower alkyl radicals containing 1–4 carbon atoms.

The radical —N=B includes the amino radical —$NH_2$, lower alkylamino radicals having the formula —NH—$R^1$, (di-lower alkyl)amino radicals having the formula —$NR^1R^2$ and saturated 5–6 membered heterocyclic tertiary-amino radicals such as piperidino, pyrrolidino, morpholino, and such cyclic amino radicals bearing a lower alkyl group $R^3$, for example 2-methylpiperidino, 2-ethylpyrrolidino, 3-ethylmorpholino, and the like. The lower alkyl radicals $R^1$, $R^2$, and $R^3$ preferably contain 1–4 carbon atoms and may be identical with, or different from, each other and the previously defined radical R when it represents lower alkyl.

It will be appreciated from the foregoing description that our invention embraces 2-(carbamylalkylaminomethyl)-1,4-benzodioxanes having the structural formula

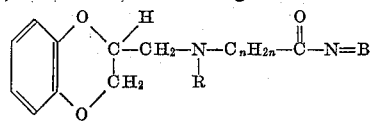

and 2-(aminoacylaminomethyl)-1,4-benzodioxans having the structural formula

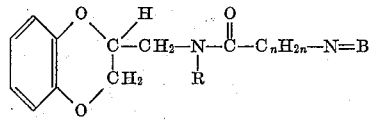

Our new compounds of formula I above are prepared by interacting together a halo-lower fatty acid amide having the formula halogen —$C_nH_{2n}$—CO—N=B and a 2-(amino- or lower alkylaminomethyl)-1,4-benzodioxan, or by interacting a 2-(halomethyl)-1,4-benzodioxan and an amino-lower fatty acid amide having the formula H—N(R)—$C_nH_{2n}$—CO—N=B, as illustrated by the following equation:

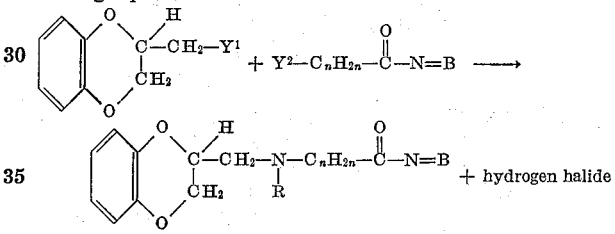

where one of $Y^1$ and $Y^2$ is halogen, preferably chlorine or bromine, and the other is H—N(R)—. In each instance, the reaction is readily carried out by heating the reactants together for several hours or for such time as is necessary to complete the reaction. It is usually advantageous to carry out the reaction in the presence of a base, for example by employing the amine reactant in excess of the required equivalent amount or by adding an alkali metal hydroxide such as sodium hydroxide, to facilitate the removal of the hydrogen halide which is produced.

Our new 2-(aminoacylaminomethyl)-1,4-benzodioxans of formula II above are readily obtained by interacting a 2-(amino- or lower alkylamino-methyl)-1,4-benzodioxan with a halo-lower fatty acyl halide or acid anhydride and treating the resulting product with an aminating agent having the formula H—N=B. Thus, for example, when a halo-lower fatty acyl halide is employed as the acylating agent, the reactions involved in the process are illustrated by the following equations:

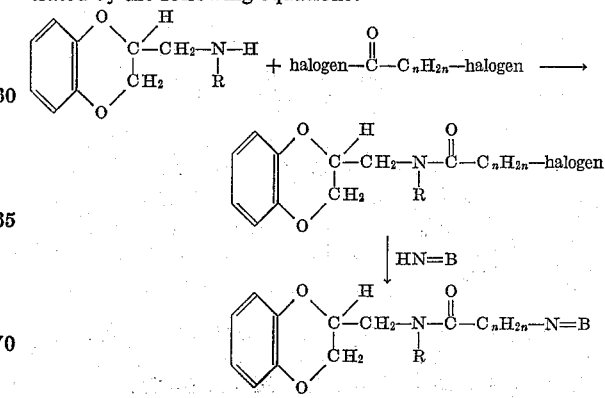

The 2-[N-(halo-lower fatty acyl)aminomethyl]-1,4-benzodioxans obtained as intermediate products in this process are substances having an oily or wax-like consistency which decompose when distilled, and it is therefore usually advantageous to employ these intermediate products without purification for the amination step. In general, we have found that it is most convenient to employ chloro- or bromo-lower fatty acyl chlorides or bromides as the acylating agent in this process.

The 2-(amino or lower alkyl-aminomethyl)-1,4-benzodioxans which are useful in the preparation of the compounds of our invention are readily obtained by interacting 2-chloromethyl-1,4-benzodioxan with ammonia or a lower alkylamine. This reaction is very conveniently carried out by heating the 2-chloromethyl-1,4-benzodioxan in an autoclave with an alcoholic solution of the aminating agent in excess of the amount required by theory.

Our invention is illustrated by the following examples without, however, being limited thereto. In these examples, for purposes of convenience and brevity in setting forth the structural formulas of the respective products described therein, the symbol A is employed to designate the 2-(1,4-benzodioxan)methyl radical having the formula

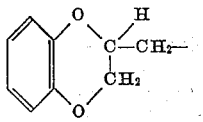

EXAMPLE 1

2-[N-methyl-N-(N,N-diethylcarbamylmethyl)-aminomethyl]-1,4-benzodioxan

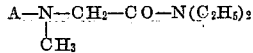

A mixture of 35.8 g. of 2-methylaminomethyl-1,4-benzodioxan (B. P. 124° C. at 4 mm.) and 15.0 g. of N,N-diethyl-2-chloroacetamide was heated for twenty-four hours at 100° C. The reaction mixture was then suspended in water, rendered alkaline by treatment with a 25% aqueous solution of potassium carbonate, and the alkaline mixture was extracted with chloroform. The chloroform solution thus obtained was dried over anhydrous potassium carbonate and, after removal of the drying agent, the chloroform was removed from the solution by evaporation. The residue thus obtained was distilled at reduced pressure to yield 2-[N-methyl-N-(N,N-diethylcarbamylmethyl)aminomethyl]-1,4-benzodioxan, which boiled at 169–170° C. at 0.7 mm. and had $n_D^{22}$ 1.5216.

The same product described above is obtained by heating a mixture of 2-chloromethyl-1,4-benzodioxan and N,N-diethyl-2-(methylamino)acetamide.

EXAMPLE 2

2-[N-(tetramethylenecarbamylmethyl)aminomethyl]-1,4-benzodioxan

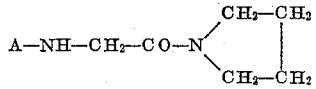

The above designated compound is obtained by interacting 2-aminomethyl-1,4-benzodioxan (B. P. 127–137° C. at 4 mm.) and N-(chloroacetyl)pyrrolidine.

EXAMPLE 3

2-[N-(2-carbamylethyl)aminomethyl]-1,4-benzodioxan

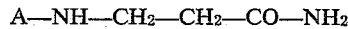

The above designated compound is obtained by interacting 2-aminomethyl-1,4-benzodioxan and 3-bromopropionamide.

EXAMPLE 4

2-{N-[2-(N-methylcarbamyl)ethyl]aminomethyl}-1,4-benzodioxan

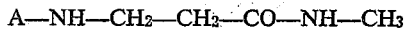

The above-designated compound was prepared by interacting 33.0 g. of 2-aminomethyl-1,4-benzodioxan and 12.1 g. of N-methyl-3-chloropropionamide. The product thus obtained boiled at 180–215° C. at 0.15 mm. and had $n_D^{22}$ 1.5120.

EXAMPLE 5

2-{N-[2-(N,N-dimethylcarbamyl)ethyl]aminomethyl}-1,4-benzodioxan

The above-designated compound was prepared by interacting 2-aminomethyl-1,4-benzodioxan and N,N-dimethyl-3-chloropropionamide. The product thus obtained boiled at 160–176° C. at 0.2 mm. and had $n_D^{19}$ 1.5452.

EXAMPLE 6

2-{N-[2-(N-ethylcarbamyl)ethyl]aminomethyl}-1,4-benzodioxan

The above-designated compound was prepared by interacting 2-aminomethyl-1,4-benzodioxan and N-ethyl-3-chloropropionamide. The product thus obtained boiled at 203–228° C. at 0.4 mm.

EXAMPLE 7

2-{N-[2-(N,N-diethylcarbamyl)ethyl]aminomethyl}-1,4-benzodioxan

The above-designated compound was prepared by interacting 2-aminomethyl-1,4-benzodioxan and N,N-diethyl-3-chloropropionamide. The product thus obtained boiled at 170–185° C. at 0.15 mm. and had $n_D^{18}$ 1.5345.

EXAMPLE 8

2-{N-methyl-N-[2-(N-methylcarbamyl)ethyl]aminomethyl}-1,4-benzodioxan

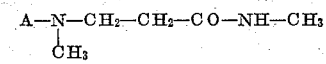

The above-designated compound was prepared by interacting 2-methylaminomethyl-1,4-benzodioxan and N-methyl-3-chloropropionamide. The product thus obtained boiled at 179–186° C. at 0.2 mm. and had $n_D^{16}$ 1.5436.

EXAMPLE 9

2-{N-methyl-N-[2-(N,N-dimethylcarbamyl)ethyl]aminomethyl}-1,4-benzodioxan

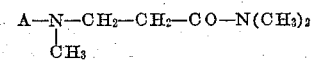

The above-designated compound was prepared by interacting 2-methylaminomethyl-1,4-benzodioxan and N,N-dimethyl-3-chloropropionamide. The product thus obtained boiled at 167–169° C. at 0.2 mm. and had $n_D^{22}$ 1.5327.

EXAMPLE 10

2-{N-methyl-N-[2-(N-ethylcarbamylethyl)aminomethyl}-1,4-benzodioxan

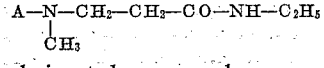

The above-designated compound was prepared by interacting 2-methylaminomethyl-1,4-benzodioxan and N-ethyl-3-chloropropionamide. The product thus obtained boiled at 183–195° C. at 0.2 mm. and had $n_D^{20}$ 1.5290.

EXAMPLE 11

2-{N-methyl-N-[2-(N,N-diethylcarbamyl)ethyl]aminomethyl}-1,4-benzodioxan

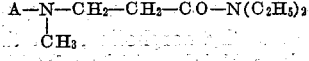

The above-designated compound was prepared by interacting 2-methylaminomethyl-1,4-benzodioxan and N,N-diethyl-3-chloropropionamide. The product thus obtained boiled at 167–169° C. at 0.2 mm. and had $n_D^{22}$ 1.5235.

EXAMPLE 12

2-{N-methyl - N - [2 - (pentamethylenecarbamyl)ethyl]aminomethyl}-1,4-benzodioxan $$A-N-CH_2-CH_2-CO-N\begin{matrix}CH_2-CH_2\\ \phantom{x}\\ CH_2-CH_2\end{matrix}CH_2$$
$$\phantom{A-N-}|\phantom{CH_2-CH_2-CO-N-}$$
$$\phantom{A-N-}CH_3$$

The above-designated compound is obtained by interacting 2-methylaminomethyl-1,4-benzodioxan and N-(3-chloropropionyl)piperidine.

EXAMPLE 13

2-{N-methyl - N - [2 - (N-propylcarbamyl)ethyl]aminomethyl}-1,4-benzodioxan $$A-N-CH_2-CH_2-CO-NH-CH_2-CH_2-CH_3$$
$$\phantom{A-N}|$$
$$\phantom{A-N}CH_3$$

The above-designated compound was prepared by interacting 2 - methylaminomethyl-1,4-benzodioxan and N-propyl-3-chloropropionamide. The product thus obtained boiled at 181–182° C. at 0.2 mm. and had $n_D^{23}$ 1.5276.

EXAMPLE 14

2-{N-methyl-N-[2-(N - isopropylcarbamyl)ethyl]aminomethyl}-1,4-benzodioxan $$A-N-CH_2-CH_2-CO-NH-CH(CH_3)_2$$
$$\phantom{A-N}|$$
$$\phantom{A-N}CH_3$$

The above-designated compound was prepared by interacting 2 - methylaminomethyl-1,4-benzodioxan and N-isopropyl-3-chloropropionamide. The product thus obtained boiled at 169–179° C. at 0.2 mm. and had $n_D^{21}$ 1.5273.

EXAMPLE 15

2-{N-ethyl-N-[2-(N-methylcarbamyl)ethyl]aminomethyl}-1,4-benzodioxan $$A-N-CH_2-CH_2-CO-NH-CH_3$$
$$\phantom{A-N}|$$
$$\phantom{A-N}C_2H_5$$

The above-designated compound was prepared by interacting 2-(ethylaminomethyl)-1,4-benzodioxan (B. P. 126–127° C. at 4 mm.) and N-methyl-3-chloropropionamide. The product thus obtained boiled at 169–177° C. at 0.15 mm. and had $n_D^{17}$ 1.5375.

EXAMPLE 16

2-{N-ethyl-N-[2-(N-ethylcarbamyl)ethyl]aminomethyl}-1,4-benzodioxan $$A-N-CH_2-CH_2-CO-NH-C_2H_5$$
$$\phantom{A-N}|$$
$$\phantom{A-N}C_2H_5$$

The above-designated compound was prepared by interacting 2 - (ethylaminomethyl)-1,4-benzodioxan and N-ethyl-3-chloropropionamide. The product thus obtained boiled at 180–186° C. at 0.4 mm. and had $n_D^{21}$ 1.5290.

EXAMPLE 17

2-{N-ethyl-N-[2-(3-oxapentamethylenecarbamyl)-ethyl]aminomethyl}-1,4-benzodioxan $$A-N-CH_2-CH_2-CO-N\begin{matrix}CH_2-CH_2\\ \phantom{x}\\ CH_2-CH_2\end{matrix}O$$
$$\phantom{A-N}|$$
$$\phantom{A-N}C_2H_5$$

The above-designated compound is obtained by interacting 2-(ethylaminomethyl)-1,4-benzodioxan and N-(3-chloropropionyl)morpholine.

EXAMPLE 18

2-{N-propyl-N-[2-(N-methylcarbamyl)ethyl]-aminomethyl}-1,4-benzodioxan $$A-N-CH_2-CH_2-CO-NH-CH_3$$
$$\phantom{A-N}|$$
$$\phantom{A-N}CH_2-CH_2-CH_3$$

The above-designated compound was prepared by interacting 2-(propylaminomethyl)-1,4-benzodioxan (B. P. 130–134° C. at 2 mm.) and N-methyl-3-chloropropionamide. The product thus obtained boiled at 185–192° C. at 0.2 mm. and had $n_D^{22}$ 1.5305.

EXAMPLE 19

2-{N-isopropyl-N-[2-(N-methylcarbamyl)ethyl]-aminomethyl}-1,4-benzodioxan $$A-N-CH_2-CH_2-CO-NH-CH_3$$
$$\phantom{A-N}|$$
$$\phantom{A-N}CH(CH_3)_2$$

The above-designated compound was prepared by interacting 2-(isopropylaminomethyl) - 1,4 - benzodioxan (B. P. 134-136° C. at 4 mm.) and N-methyl-3-chloropropionamide. The product thus obtained boiled at 170–190° C. at 0.1 mm. and had $n_D^{22}$ 1.5320.

EXAMPLE 20

2-[N-methyl-N-(N,N-diethylaminoacetyl)aminomethyl]-1,4-benzodioxan $$A-N-CO-CH_2-N(C_2H_5)_2$$
$$\phantom{A-N}|$$
$$\phantom{A-N}CH_3$$

3.6 g. of 2-methylaminomethyl-1,4-benzodioxan was dissolved in 50 ml. of 8% aqueous sodium hydroxide solution, and to this solution there was added 2.3 g. of chloroacetyl chloride. After the reaction had terminated, the oil which had separated from the mixture was extracted with chloroform, the chloroform solution was agitated in contact with water, and the chloroform solution was then separated and dried over sodium sulfate. After the removal of the drying agent, the chloroform was removed from the solution by evaporation, thus yielding an oily residue. Since it was found that this product, which was 2-[N-methyl-N-(chloroacetyl)aminomethyl]-1,4-benzodioxan, was sensitive to heat and tended to decompose if distilled, it was treated directly without purification with diethylamine, the mixture being heated in a closed tube on a water bath. The amination product thus obtained was dissolved in water, the solution was rendered alkaline by treatment with 20% aqueous sodium hydroxide solution, and the mixture was then extracted with chloroform. The chloroform was removed from the solution by evaporation and the residue thus obtained was distilled under reduced pressure. There was thus obtained 2-[N-methyl-N-(N,N-diethylaminoacetyl)aminomethyl]-1,4-benzodioxan as a colorless oil which boiled at 153–163° C. at 0.2 mm. and had $n_D^{20}$ 1.5285. The compound was fluorescent under Wood's light.

The intermediate 2-[N-methyl-N-(chloroacetyl)aminomethyl]-1,4-benzodioxan is also obtained when chloroacetyl anhydride is employed instead of chloroacetyl chloride in the first step of this example.

EXAMPLE 21

2 - {N - [(2 - methylpiperidino)acetyl]aminomethyl}-1,4-benzodioxan $$A-NH-CO-CH_2-N\begin{matrix}CH_2-CH_2\\ \phantom{x}\\ CH-CH_2\\ |\\ CH_3\end{matrix}CH_2$$

The above-designated compound is obtained by interacting 2-aminomethyl-1,4-benzodioxan and chloroacetyl chloride, followed by treatment of the resulting 2-[N-(chloroacetyl)aminomethyl] - 1,4 - benzodioxan with 2-methylpiperidine.

EXAMPLE 22

*2-{N-methyl-N-[3-(N,N-diethylamino)propionyl]aminomethyl}-1,4-benzodioxan*

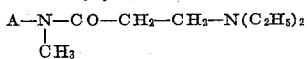

Employing a procedure similar to that described above in Example 21, 2-methylaminomethyl-1,4-benzodioxan was interacted with 3-chloropropionyl chloride to yield 2-[N-methyl-N-(3-chloropropionyl)aminomethyl]-1,4-benzodioxan, which had a wax-like consistency, and this product was interacted with diethylamine. There was thus obtained 2-{N-methyl-N-[3-(N,N-diethylamino)-propionyl]aminomethyl}-1,4-benzodioxan in the form of a colorless oil which boiled at 178–182° C. at 0.4 mm. and had $n_D^{19}$ 1.5300.

EXAMPLE 23

*2-[N-ethyl-N-(3-morpholinobutyryl)aminomethyl] - 1,4-benzodioxan*

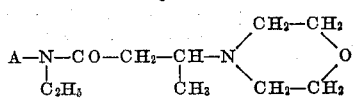

The above-designated compound is obtained by interacting 2-(ethylaminomethyl)-1,4-benzodioxan and 3-chlorobutyryl chloride, and treating the resulting 2-[N-ethyl-N-(3-chlorobutyryl)aminomethyl]-1,4-benzodioxan with morpholine.

In addition to the above examples, the following compounds are also illustrative of our invention:

2 - [N - butyl-N-(N-methyl-N-ethylcarbamylmethyl)-aminomethyl]-1,4-benzodioxan, having the formula

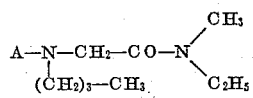

2 - {N - [1 - methyl-2-(N-methyl-N-propylcarbamyl)-ethyl]-aminomethyl}-1,4-benzodioxan, having the formula

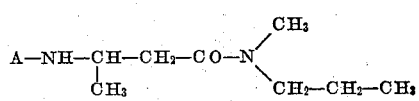

2 - {N - methyl - N - [2-(2-ethylpyrrolidinocarbamyl)-ethyl]aminomethyl}-1,4-benzodioxan, having the formula

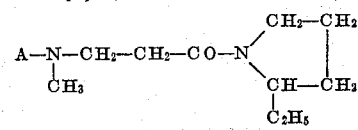

2 - {N - ethyl-N-[4-(N-methyl-N-butylamino)butyryl]-aminomethyl}-1,4-benzodioxan, having the formula

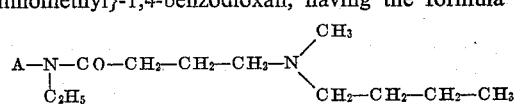

2-[N-propyl-N-(3-aminopropionyl)aminomethyl]-1,4-benzodioxan, having the formula

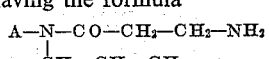

Our new compounds react with acidic reagents, for example mineral and organic acids such as hydrochloric acid, sulfuric acid, citric acid, picric acid, picrolonic acid, and the like to form salts, in the characteristic manner of amines. In many instances the salts thus obtained are non-crystalline or can be obtained in crystalline form only with considerable difficulty, but this does not act as a drawback in the utilization of the compounds, since they can be used in aqueous solution or in combination with excipients. As will be understood, the salts of our compounds exhibit the characteristic physiological properties of the free amine forms with which they are equivalent.

We claim:

1. A compound having the formula

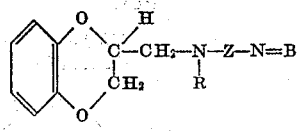

where R is a member of the class consisting of hydrogen and lower alkyl radicals, Z is an alpha-oxo-lower alkylene radical, and —N=B is a member of the group consisting of the amino radical and lower alkylamino (di-lower alkyl)amino, piperidino, lower alkylpiperidino, morpholino, lower alkylmorpholino, pyrrolidino, and lower alkylpyrrolidino radicals.

2. A 2-{N-[2-(N,N-dialkylcarbamyl)ethyl]aminomethyl}-1,4-benzodioxan having the formula

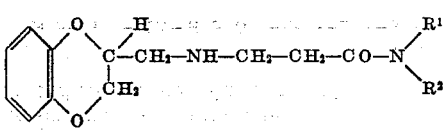

where $R^1$ and $R^2$ are lower alkyl radicals.

3. A 2-{N-[2-(N-lower alkylcarbamyl)ethyl]aminomethyl}-1,4-benzodioxan having the formula

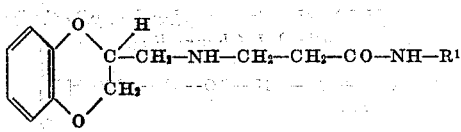

where $R^1$ is a lower alkyl radical.

4. A 2-{N-lower alkyl-N-[2-(N,N-di-lower alkylcarbamyl)-ethyl]aminomethyl}-1,4-benzodioxan having the formula

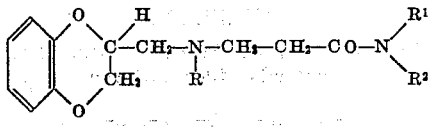

where R, $R^1$, and $R^2$ are lower alkyl radicals.

5. A 2-{N-lower alkyl-N-[2-(N-lower alkylcarbamyl)-ethyl]aminomethyl}-1,4-benzodioxan having the formula

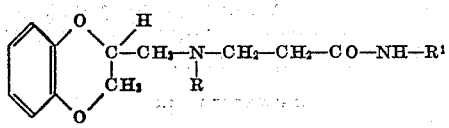

where R and $R^1$ are lower alkyl radicals.

6. A 2-[N-(N,N-di-lower alkylcarbamylmethyl)aminomethyl]-1,4-benzodioxan having the formula

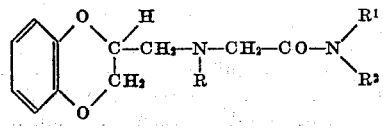

where R, $R^1$, and $R^2$ are lower alkyl radicals.

7. A 2-[N-lower alkyl-N-(N-lower alkylcarbamylmethyl)-aminomethyl]-1,4-benzodioxan having the formula

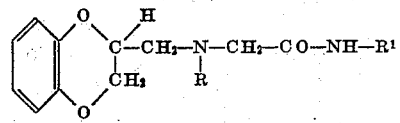

where R and $R^1$ are lower alkyl radicals.

8. A 2-[N-(N-lower alkylaminoacetyl)aminomethyl]-

1,4-benzodioxan having the formula

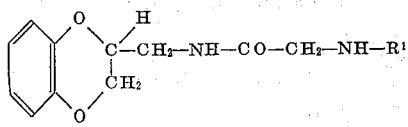

where $R^1$ is a lower alkyl radical.

9. A 2-[N-lower alkyl-N-(N,N-di-lower alkylaminoacetyl)aminomethyl]-1,4-benzodioxan having the formula

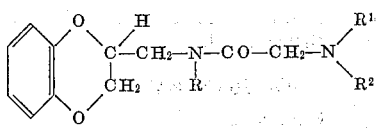

where R, $R^1$, and $R^2$ are lower alkyl radicals.

10. A 2-{N-[3-(N-lower alkylamino)propionyl]amino-methyl}-1,4-benzodioxan having the formula

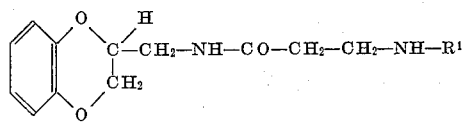

where $R^1$ is a lower alkyl radical.

11. A 2-{N-lower alkyl-N-[3-(N,N-di-lower alkylamino)-propionyl]aminomethyl}-1,4-benzodioxan having the formula

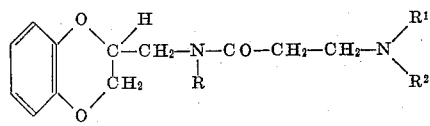

where R, $R^1$, and $R^2$ are lower alkyl radicals.

12. A process for the preparation of a 2-(carbamyl-alkylaminomethyl)-1,4-benzodioxan having the formula

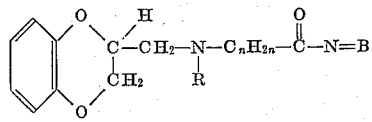

where R is a member of the class consisting of hydrogen and lower alkyl radicals, n is an integer of the group 1 to 3 inclusive, and —N=B is a member of the group consisting of the amino radical and lower alkylamino, (di-lower alkyl)amino, piperidino, lower alkylpiperidino, morpholino, lower alkylmorpholino, pyrrolidino, and lower alkylpyrrolidino radicals, which comprises interacting a compound having the formula

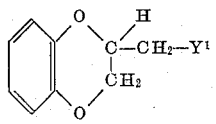

with a compound having the formula

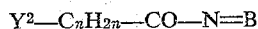

$Y^2—C_nH_{2n}—CO—N=B$ where one of $Y^1$ and $Y^2$ is halogen and the other is an amino radical having the formula H—N(R)—.

13. A process for the preparation of a 2-{N-[2-(N,N-dialkylcarbamyl)ethyl]aminoethyl}-1,4-benzodioxan having the formula

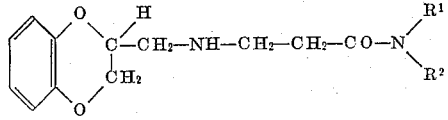

where $R^1$ and $R^2$ are lower alkyl radicals, which comprises interacting 2-aminomethyl-1,4-benzodioxan with an N,N-di-lower alkyl-3-halopropionamide.

14. A process for the preparation of a 2-{N-[2-(N-lower alkylcarbamyl)ethyl]aminomethyl}-1,4-benzodioxan having the formula

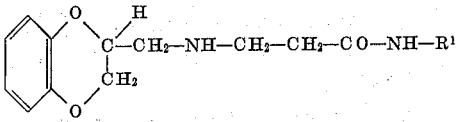

where $R^1$ is a lower alkyl radical, which comprises interacting 2-aminomethyl-1-4-benzodioxan with an N-lower alkyl-3-halopropionamide.

15. A process for the preparation of a compound of a 2-{N-lower alkyl-N-[2-(N,N-di-lower alkylcarbamyl)-ethyl]aminomethyl}-1,4-benzodioxan having the formula

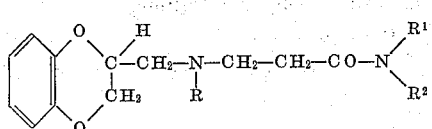

where R, $R^1$, and $R^2$ are lower alkyl radicals, which comprises interacting a 2-(lower alkylaminomethyl)-1,4-benzodioxan with an N,N-di-lower alkyl-3-halopropionamide.

16. A process for the preparation of a 2-{N-lower alkyl-N-[2-(N-lower alkylcarbamyl)ethyl]aminomethyl}-1,4-benzodioxan having the formula

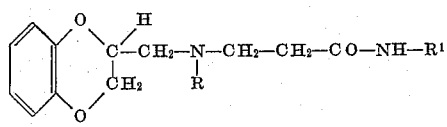

where R and $R^1$ are lower alkyl radicals, which comprises interacting a 2-(lower alkylaminomethyl)-1,4-benzodioxan with an N-lower alkyl-3-halopropionamide.

17. A process for the preparation of a 2-(aminoacyl-aminomethyl)-1,4-benzodioxan having the structural formula

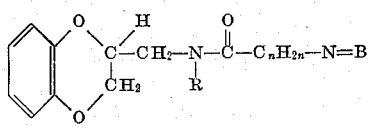

where R is a member of the class consisting of hydrogen and lower alkyl radicals, n is an integer of the group 1 to 3 inclusive, and —N=B is a member of the group consisting of the amino radical and lower alkylamino, (di-lower alkyl)amino, piperidino, lower alkylpiperidino, morpholino, lower alkylmorpholino, pyrrolidino, and lower alkylpyrrolidino radicals, which comprises interacting a 2-[H-N(R)-CH₂-]-1,4-benzodioxan with a halo-lower fatty acylating agent of the group consisting of halo-lower fatty acyl halides and halo-lower fatty acid anhydrides; and treating the 2-[N-(halo-lower fatty acyl)aminomethyl]-1,4-benzodioxan thus obtained with an aminating agent having the formula H—N=B.

18. A process for the preparation of a 2-[N-lower alkyl-N-(N,N-di-lower alkylaminoacetyl)aminomethyl]-1,4-benzodioxan having the formula

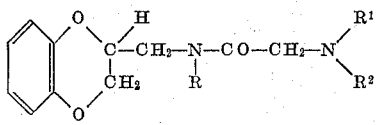

where R, $R^1$, and $R^2$ are lower alkyl radicals, which comprises interacting a 2-(lower alkylaminomethyl)-1,4-benzodioxan with a haloacetyl halide; and treating the 2-(N-lower alkyl-N-haloacetyl)aminomethyl-1,4-benzo-dioxan thus obtained with a (di-lower alkyl)amine.

19. A process for the preparation of a 2-{N-lower alkyl-N-[3-(N,N-di-lower alkylamino)propionyl]aminomethyl}-1,4-benzodioxan having the formula

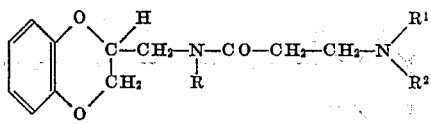

where R, R¹, and R² are lower alkyl radicals, which comprises interacting a 2-(lower alkylamino)-1,4-benzodioxan with a 3-halopropionyl halide; and treatment of the 2-[N-lower alkyl-N-(3-halopropionyl)aminomethyl]-1,4-benzodioxan thus obtained with a (di-lower alkyl)-amine.

20. 2-{N-[2-(N-methylcarbamyl)ethyl]aminoethyl}-1,4-benzodioxan, having the formula

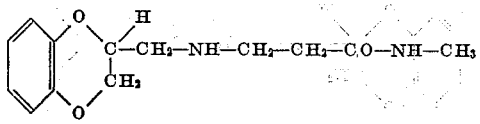

21. 2-{N-[2-(N,N-dimethylcarbamyl)ethyl]aminomethyl}-1,4-benzodioxan, having the formula

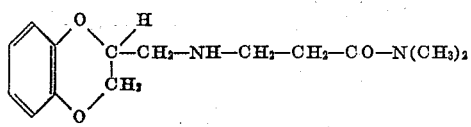

References Cited in the file of this patent

UNITED STATES PATENTS

| 2,056,046 | Fourneau | Sept. 29, 1936 |
| 2,654,754 | Bruce et al. | Oct. 6, 1953 |

FOREIGN PATENTS

| 468,504 | Canada | Oct. 3, 1950 |

OTHER REFERENCES

Mikami: Chem. Abst., vol. 33, col. 8315 (1939).